US010096872B2

(12) United States Patent
Nakano et al.

(10) Patent No.: US 10,096,872 B2
(45) Date of Patent: Oct. 9, 2018

(54) BATTERY UNIT (71) Applicant: HONDA MOTOR CO., LTD., Tokyo (JP)

(72) Inventors: Kazuya Nakano, Wako (JP); Manabu Mitani, Wako (JP); Sachiko Katsuno, Wako (JP); Koichi Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 215 days.

(21) Appl. No.: 15/298,237

(22) Filed: Oct. 20, 2016

(65) Prior Publication Data
US 2017/0110774 A1    Apr. 20, 2017

(30) Foreign Application Priority Data

Oct. 20, 2015   (JP) .................................. 2015-206587

(51) Int. Cl.
*H01M 10/6566* (2014.01)
*H01M 10/613* (2014.01)
*H01M 10/625* (2014.01)
*H01M 10/663* (2014.01)
*H01M 10/6563* (2014.01)
*H01M 10/6569* (2014.01)
*H01M 2/10* (2006.01)

(52) U.S. Cl.
CPC ..... *H01M 10/6566* (2015.04); *H01M 2/1077* (2013.01); *H01M 10/613* (2015.04); *H01M 10/625* (2015.04); *H01M 10/6563* (2015.04); *H01M 10/663* (2015.04); *H01M 2220/20* (2013.01)

(58) Field of Classification Search
CPC ........... H01M 10/6566; H01M 10/613; H01M 10/625; H01M 10/6563; H01M 10/663; H01M 10/6569; H01M 2/1077; H01M 2220/20

See application file for complete search history.

(56) References Cited

U.S. PATENT DOCUMENTS

| 2011/0104548 | A1* | 5/2011 | Saito | .................... | H01M 2/1072 |
| | | | | | 429/120 |
| 2011/0256432 | A1* | 10/2011 | Tenhouten | .......... | H01M 2/1072 |
| | | | | | 429/50 |
| 2012/0121959 | A1* | 5/2012 | Yamada | .................... | B60K 1/04 |
| | | | | | 429/100 |

FOREIGN PATENT DOCUMENTS

JP          2014-127338        7/2014

* cited by examiner

*Primary Examiner* — Gregg Cantelmo
(74) *Attorney, Agent, or Firm* — Mori & Ward, LLP (57) ABSTRACT

A lower battery module includes lower batteries and lower cooling air passages. An upper battery module is provided at an downstream of the lower battery module in a flow direction of the cooling air. The upper battery module includes upper batteries and upper cooling air passages. An intermediate duct is provided between the upper battery module and the lower battery module to prevent leakage of the cooling air. The intermediate duct includes a cutwater portion. The cutwater portion is provided along an inner circumference of the intermediate duct to cut a continuous flow of water from an inside of the upper battery module to an inside of the lower battery module.

6 Claims, 9 Drawing Sheets

BATTERY UNIT

CROSS-REFERENCE TO RELATED APPLICATIONS

The present application claims priority under 35 U. S. C. § 119 to Japanese Patent Application Ser. No. 2015-206587, filed Oct. 20, 2015. The contents of this application are incorporated herein by reference in their entirety.

BACKGROUND OF THE INVENTION

Field of the Invention
The present invention relates to a battery unit.
Discussion of the Background
A battery unit including a battery module formed of multiple batteries is installed in vehicles such as an electric vehicle and a hybrid vehicle (see Japanese Patent Application Publication No. 2014-127338, for example). This type of vehicle includes a cooling mechanism for maintaining the temperature of the battery within an appropriate range, to prevent degradation in performance of the battery due to an abnormal temperature rise. For example, a battery module cooled by an air-cooled cooling mechanism includes multiple passages between multiple batteries arranged in parallel, and the batteries are cooled by passing cooling air through the passages.

SUMMARY OF THE INVENTION

According to one aspect of the present invention, a battery unit includes a battery module formed of multiple batteries arranged in parallel, with cooling air passages interposed therebetween. In the battery unit, the battery module includes an upper battery module and a lower battery module stacked in a flow direction of cooling air. An intermediate duct for preventing leakage of cooling air is arranged between the upper battery module and the lower battery module. A cutwater portion for cutting a continuous flow of water from the inside of the upper battery module to the inside of the lower battery module is provided, along an inner circumference of the intermediate duct.

According to another aspect of the present invention, a battery unit includes a lower battery module, an upper battery module, and an intermediate duct. The lower battery module includes lower batteries and lower cooling air passages. Each of the lower cooling air passages is interposed between a first lower battery and a second lower battery adjacent to the first lower battery among the lower batteries. The upper battery module is stacked on the lower battery module via a gap at a downstream of the lower battery module in a flow direction of the cooling air. The upper battery module includes upper batteries and upper cooling air passages. Each of upper cooling air passages is interposed between a first upper battery and a second upper battery adjacent to the first upper battery among the upper batteries. The intermediate duct is provided between the upper battery module and the lower battery module to prevent leakage of the cooling air. The intermediate duct includes a cutwater portion. The cutwater portion is provided along an inner circumference of the intermediate duct to cut a continuous flow of water from an inside of the upper battery module to an inside of the lower battery module.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, an embodiment of a vehicle of the present invention will be described with reference to the accompanying drawings. Note that the drawings are to be viewed in the direction of the reference numerals. In the following description, front and rear, right and left, and upper and lower directions are based on directions as viewed from the driver, and in the drawings, Fr indicates the front, Rr indicates the rear, L indicates the left, R indicates the right, U indicates the upper direction, and D indicates the lower direction of the vehicle.

[Vehicle]

Figure 1:
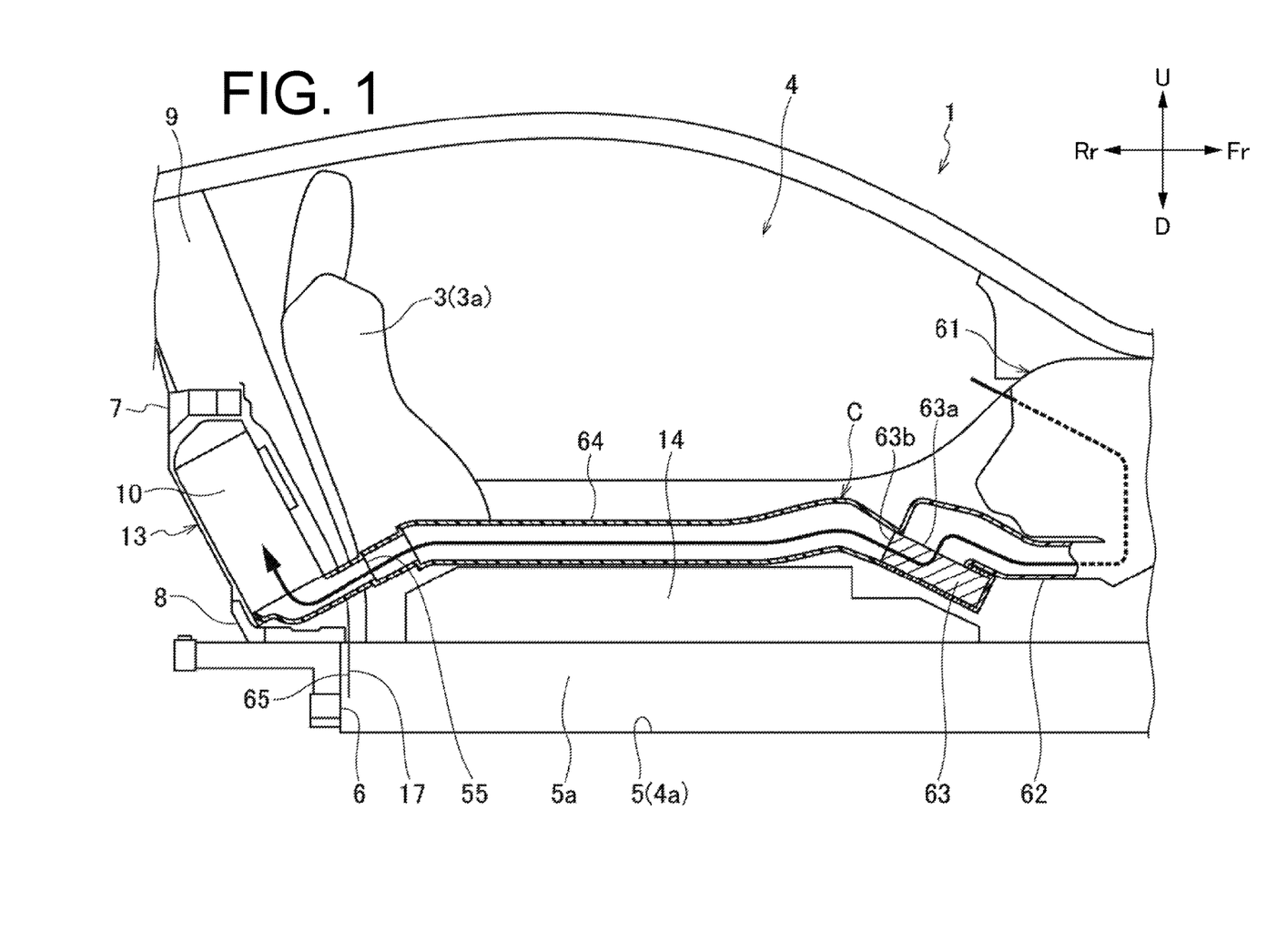
FIG. 1 is a schematic right side view of the interior of a vehicle according to an embodiment of the present invention.
Figure 2:
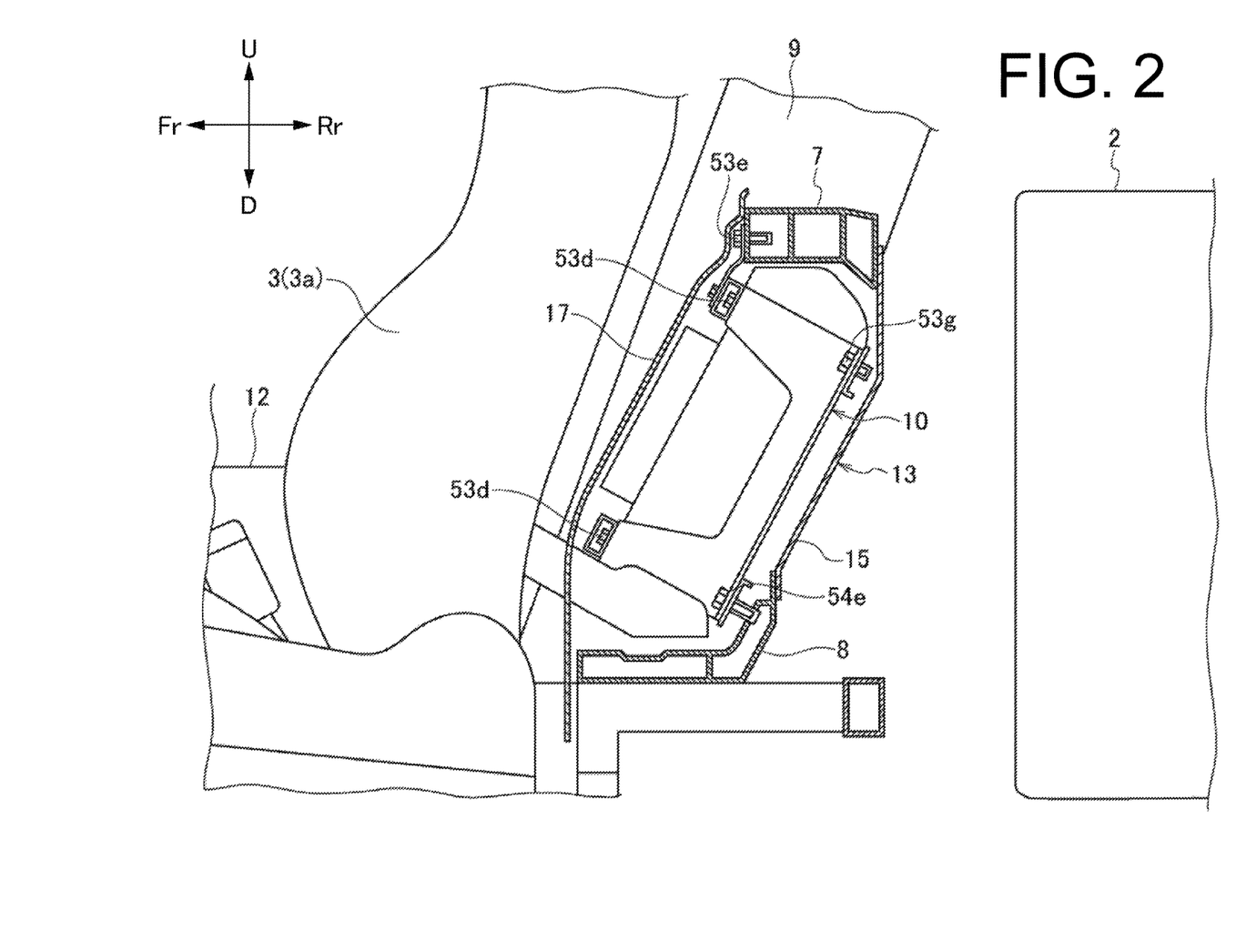
FIG. 2 is a left side view in which the rear of a seat is enlarged.

FIG. 1 is a schematic right side view of the interior of the vehicle according to an embodiment of the present invention, and FIG. 2 is a left side view in which the rear of a seat is enlarged.

As shown in FIGS. 1 and 2, a vehicle 1 of the embodiment is a hybrid sports vehicle in which an engine 2 is installed in a rear part of the vehicle body, and right and left seats 3 are arranged in front of the engine. In the vehicle, engine power drives right and left rear wheels (not shown), and two motors (not shown) drive right and left front wheels (not shown).

A floor panel 5 constituting a floor surface of a vehicle inside 4 includes a center tunnel 5a, which extends along the longitudinal direction at the center in the vehicle width direction. An upward rising kick-up portion 6 is formed in a rear end part of the floor panel 5. An inverter case 14 accommodating an inverter (not shown), which converts a DC voltage of a high voltage battery into a three-phase AC voltage and drives the motors, is provided above the center tunnel 5a. The seats 3 are arranged in front of the kick-up portion 6, on the right and left with the center tunnel 5a interposed therebetween, and a center console 12 covering an upper part of the center tunnel 5a is provided between the right and left seats 3.

An upper member 7 extending in the vehicle width direction is arranged in an upper part behind the seats 3, and a lower member 8 extending in the vehicle width direction on an upper part of the kick-up portion 6 is arranged in a lower part behind the seats 3. Also, a right and left pair of pillars 9 stand on both end parts in the vehicle width direction of the vehicle 1, behind the seats 3 in side view. A high voltage equipment-accommodation portion 13 is provided between the right and left pair of pillars 9.

[High Voltage Equipment-Accommodation Portion]

Figure 3:
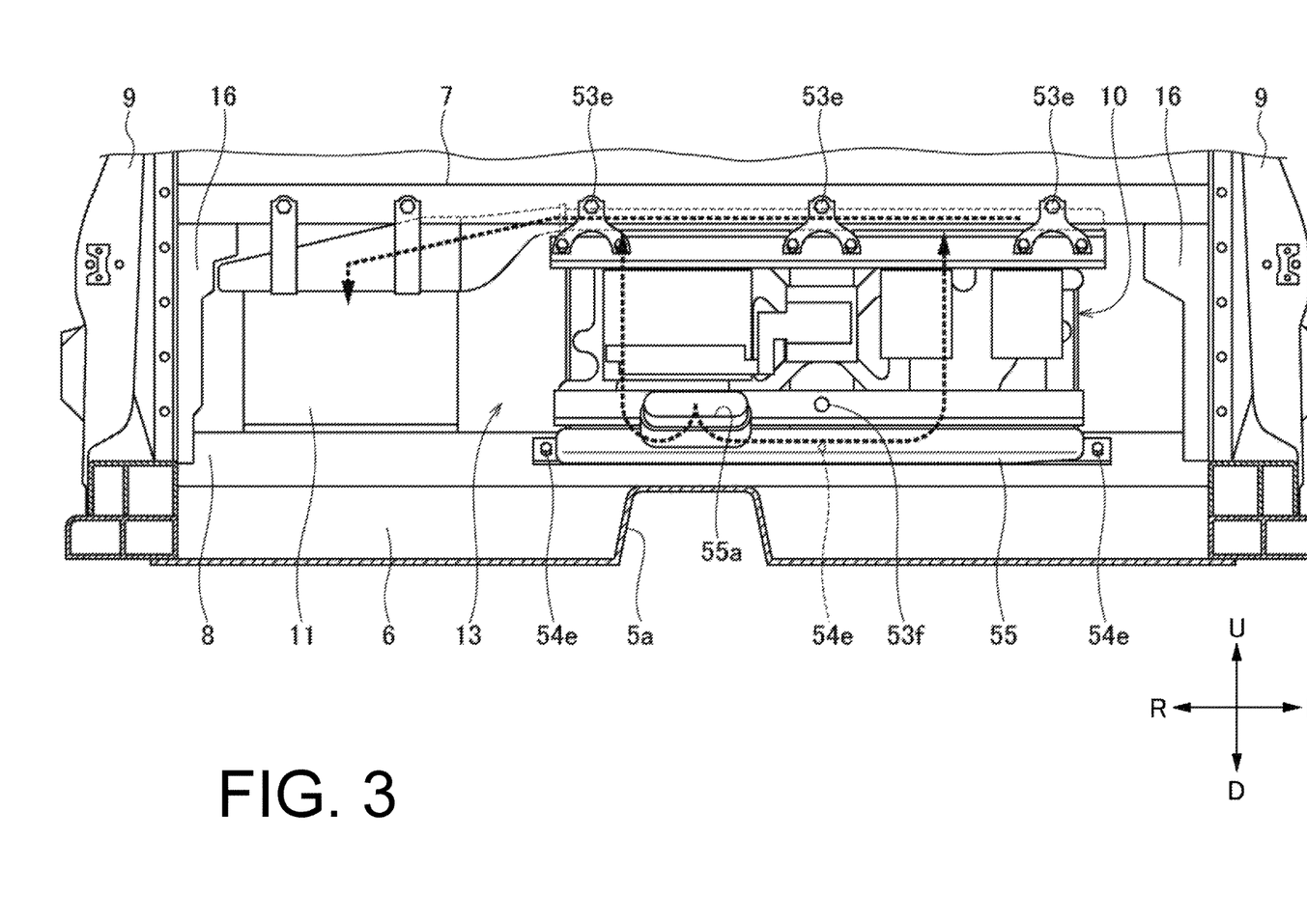
FIG. 3 is a front view of a high voltage equipment-accommodation portion in which a battery unit is arranged.
Figure 7:
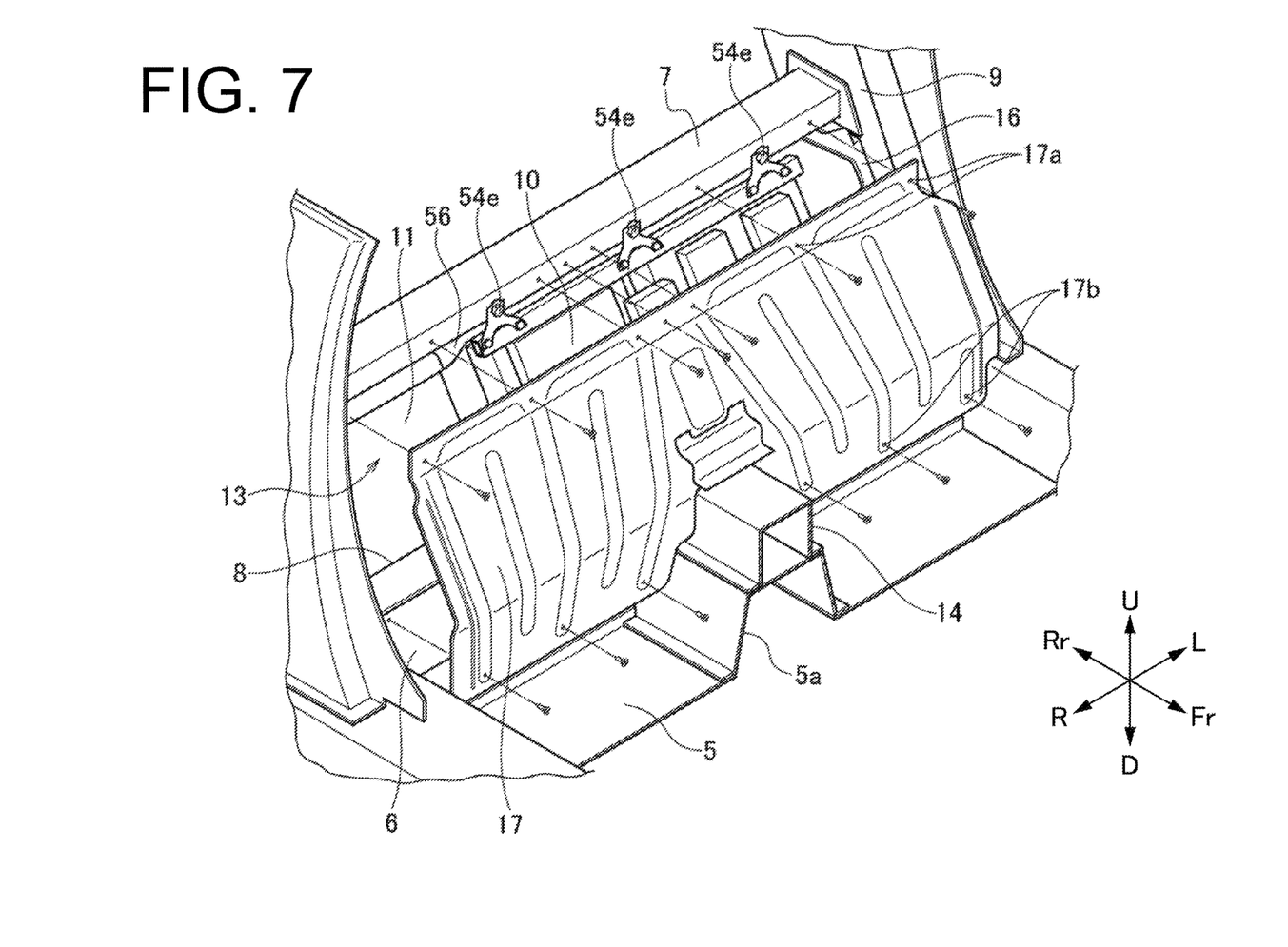
FIG. 7 is an exploded perspective view of a high voltage equipment-protection cover covering the front of the high voltage equipment-accommodation portion.

FIG. 3 is a front view of the high voltage equipment-accommodation portion 13, and FIG. 7 is an exploded perspective view of a high voltage equipment-protection cover 17 covering the front of the high voltage equipment-accommodation portion 13.

As shown in FIGS. 2 and 3, in the high voltage equipment-accommodation portion 13, the upper member 7 partitions an upper part, the lower member 8 partitions a lower part, the right and left pillars 9 partition right and left sides, and a rear cover 15, which is fastened to the upper member 7, lower member 8, and right and left pillars 9, partitions a rear part. The high voltage equipment-accommodation portion 13 accommodates a battery unit 10 and a DC-DC converter 11, which steps the high voltage battery down and supplies the voltage to low voltage equipment.

As shown in FIG. 7, the high voltage equipment-protection cover 17 covers the front of the high voltage equipment-accommodation portion 13, which accommodates the battery unit 10 and the DC-DC converter 11. The high voltage equipment-protection cover 17 includes multiple fastening points 17a, 17b in upper and lower end parts thereof. The high voltage equipment-protection cover 17 partitions the front part of the high voltage equipment-accommodation portion 13, when the fastening points 17a, 17b are fastened to the upper member 7 and the lower member 8.

[High Voltage Equipment]

The vehicle 1 is provided with the battery unit 10 consisting of a high voltage battery, as high voltage equipment. As mentioned above, the battery unit 10, together with the DC-DC converter 11, is accommodated in the high voltage equipment-accommodation portion 13 provided behind the seats 3.

Figure 4:
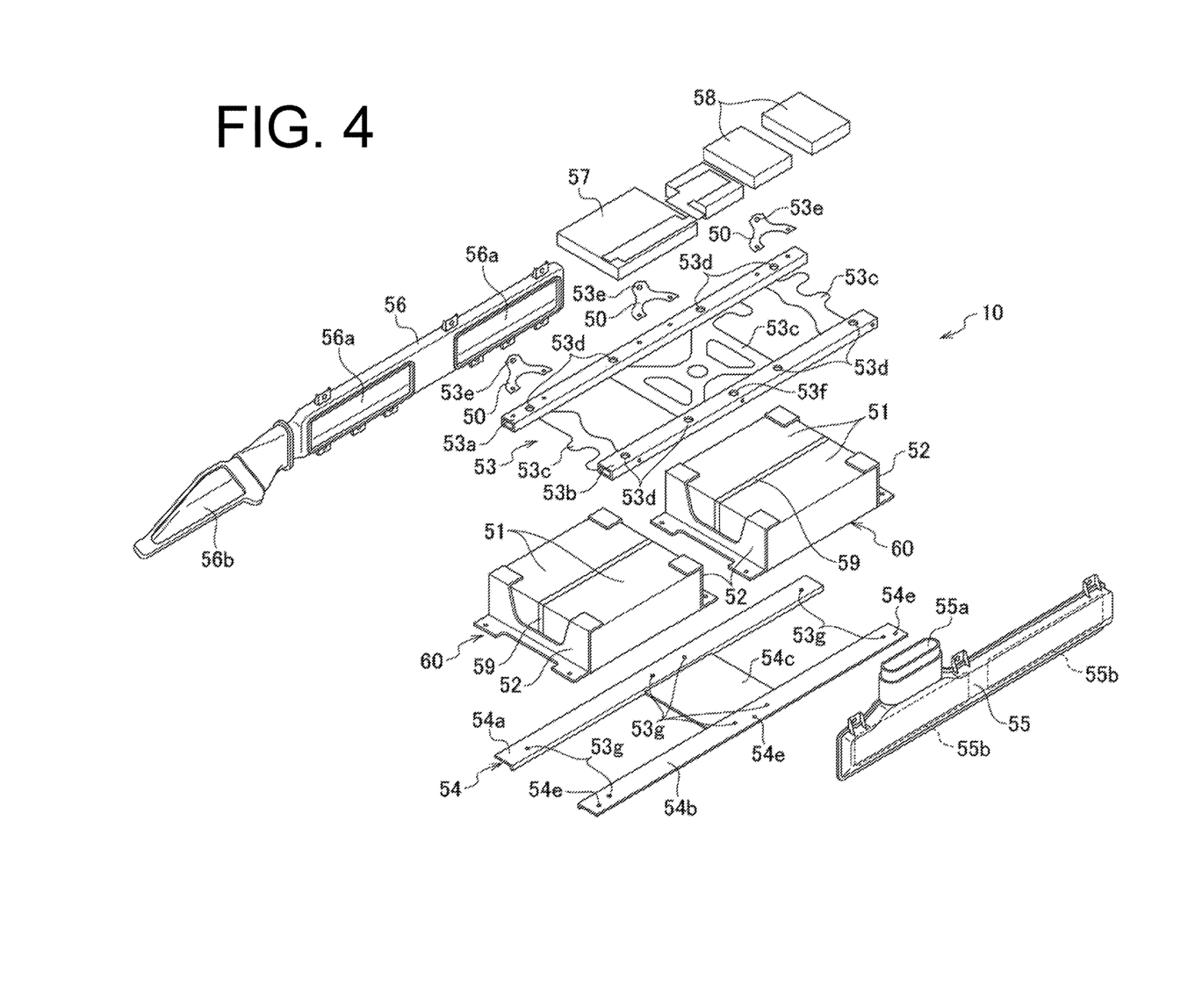
FIG. 4 is an exploded perspective view of the battery unit.
Figure 5:
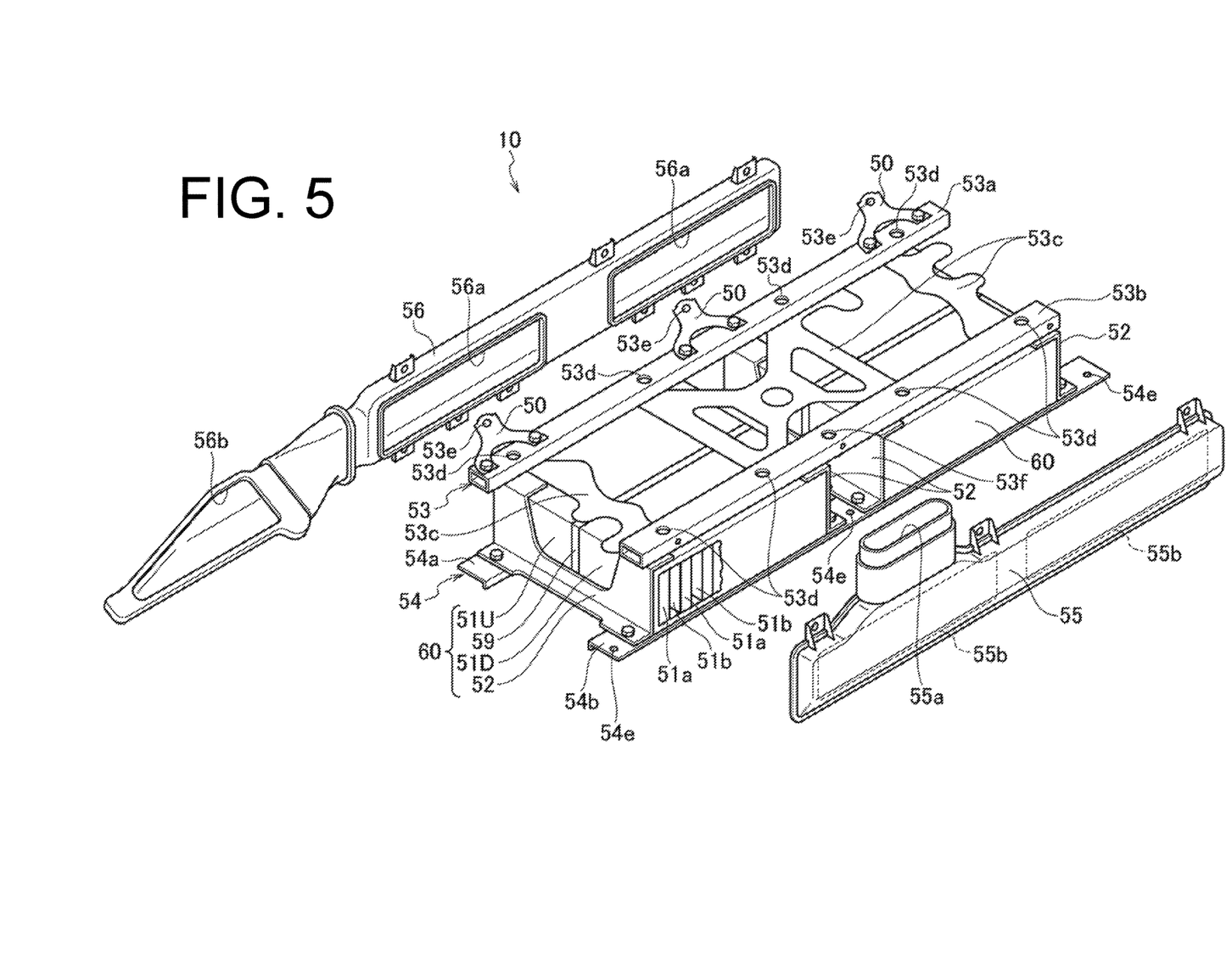
FIG. 5 is an exploded perspective view of the battery unit in which only ducts are disassembled.
Figure 6:
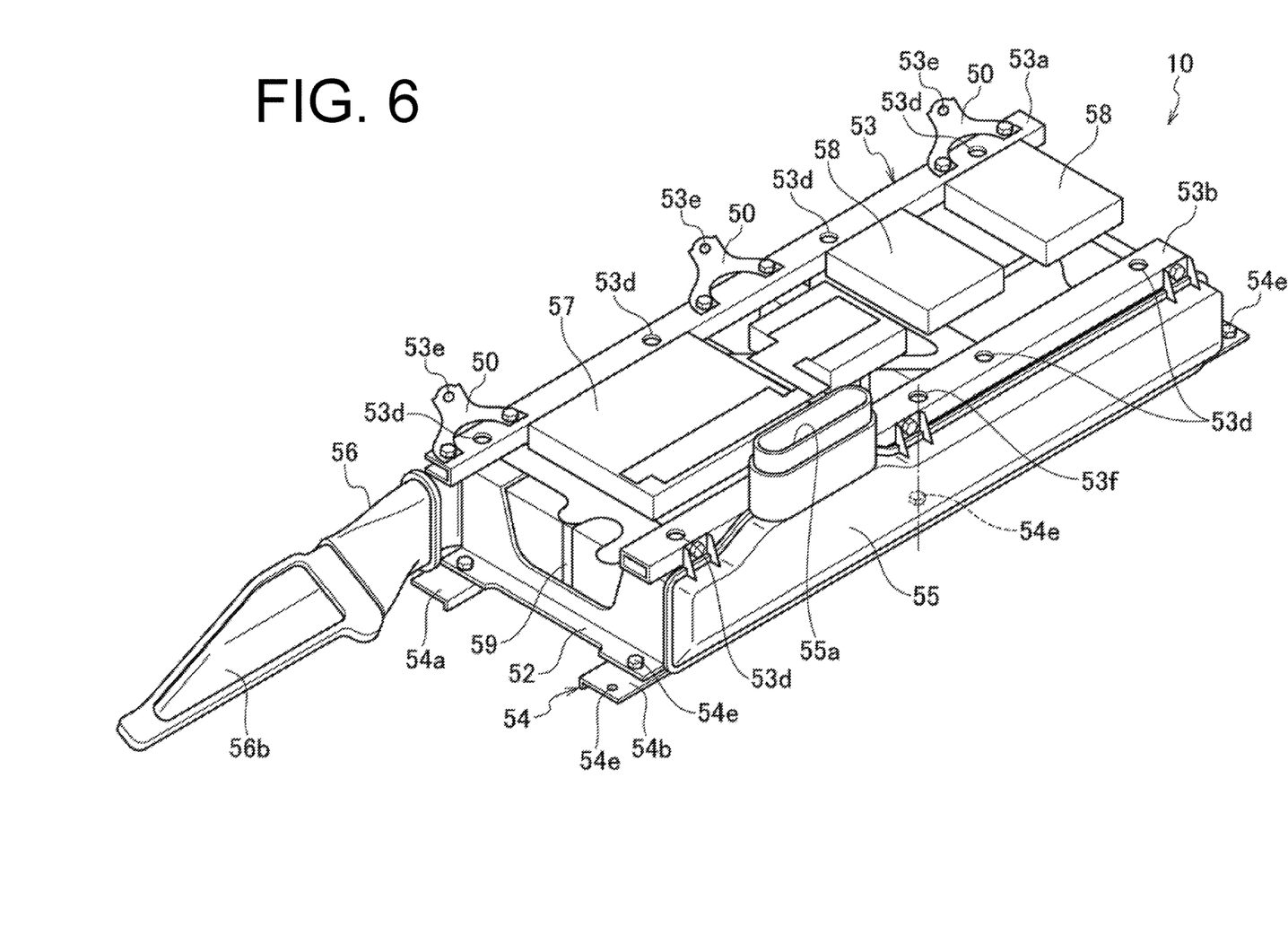
FIG. 6 is a perspective view of the battery unit.

FIG. 4 is an exploded perspective view of the battery unit 10, FIG. 5 is an exploded perspective view of the battery unit 10 in which only ducts are dissembled, and FIG. 6 is a perspective view of the battery unit 10.

As shown in FIGS. 4 to 6, the battery unit 10 includes: multiple battery modules 51; multiple battery brackets 52 supporting right and left side parts of the battery module 51; a front frame 53 provided along a front surface of the battery unit 10 and supporting the multiple battery modules 51 through the battery brackets 52; a rear frame 54 provided along a rear surface of the battery unit 10 and supporting the multiple battery modules 51 through the battery brackets 52; an inlet duct 55 provided along a lower surface of the battery unit 10, and introducing cooling air fed from outside the high voltage equipment-accommodation portion 13 into the battery modules 51; an exhaust duct 56 provided along an upper surface of the battery unit 10, and discharging cooling air having passed through the battery modules 51 to the DC-DC converter 11; a battery control unit 57 provided on the front frame 53, and controlling charging and discharging of the battery modules 51; and a pair of motor control units 58 provided on the front frame 53, and controlling driving of the motors.

The battery module 51 includes multiple batteries 51a arranged in parallel, with cooling air passages 51b interposed therebetween. The battery module 51 includes an upper battery module 51U and a lower battery module 51D stacked in the flow direction of cooling air, and an intermediate duct 59 for preventing leakage of cooling air is arranged between the upper battery module 51U and the lower battery module 51D. The vertically stacked upper battery module 51U and lower battery module 51D are connected by the battery brackets 52 provided on both right and left side surfaces thereof, and form a battery assembly 60. The battery unit 10 of the embodiment is configured of two battery assemblies 60 arranged side by side in the vehicle width direction.

The front frame 53 includes: an upper frame member 53a extending in the vehicle width direction in an upper part of the front surface of the battery unit 10; a lower frame member 53b extending in the vehicle width direction in a lower part of the front surface of the battery unit 10; and multiple connection members 53c connecting the upper frame member 53a and the lower frame member 53b. Multiple battery fastening points 53d fastened to the battery brackets 52 are provided in the upper frame member 53a and the lower frame member 53b. Additionally, three Y-formed brackets 50 each having an upper fastening point 53e fastened to the upper member 7 are attached to the upper frame member 53a, while a tool insertion hole 53f for inserting a tool when fastening the rear frame 54 to the lower member 8 is formed at the center in the vehicle width direction of the lower frame member 53b.

The rear frame 54 includes: an upper frame member 54a extending in the vehicle width direction in an upper part of the rear surface of the battery unit 10; a lower frame member 54b extending in the vehicle width direction in a lower part of the rear surface of the battery unit 10; and a connection member 54c connecting the upper frame member 54a and the lower frame member 54b. Multiple battery fastening points 53g fastened to the battery brackets 52 are provided in the upper frame member 54a and the lower frame member 54b. Three lower fastening points 54e fastened to the lower member 8 are provided in the lower frame member 54b.

The inlet duct 55 includes: an inlet port 55a for introducing cooling air fed from outside the high voltage equipment-accommodation portion 13 into the duct; and two battery connection ports 55b connected to the lower surface side of the lower battery modules 51D, and allowing cooling air inside the duct to flow into the passages 51b in the lower battery modules 51D.

The exhaust duct 56 includes; two battery connection ports 56a connected to the upper surface side of the upper battery modules 51U, and introducing cooling air having flowed out from the passages 51b in the upper battery modules 52U into the duct; and an exhaust port 56b for discharging cooling air inside the duct to the DC-DC converter 11.

When storing the battery unit 10 and the DC-DC converter 11 in the high voltage equipment-accommodation portion 13, first, a rear insulator (not shown) extending along a front surface of the rear cover 15, and right and left side insulators 16 extending along the inner side of the right and left pillars 9 are attached inside the high voltage equipment-accommodation portion 13. Then, while the battery unit 10 is positioned in a left offset position inside the high voltage equipment-accommodation portion 13, the upper fastening points 53e of the front frame 53 are fastened to the upper member 7 with bolts, and the lower fastening points 54e of the rear frame 54 are fastened to the lower member 8 with bolts. Note that when fastening the middle lower fastening point 54e of the rear frame 54 to the lower member 8 with a bolt, a tool is inserted into the tool insertion hole 53f formed at the center in the vehicle width direction of the lower frame member 53b, and the rear frame 54 is fastened to the lower member 8 with a bolt. Thus, the battery unit 10 is fixed inside the high voltage equipment-accommodation portion 13, while being tilted rearward along a back 3a of the seat 3 in side view. Thereafter, the DC-DC converter 11 is positioned in a right offset position inside the high voltage equipment-accommodation portion 13, and fastened to the upper member 7 and the lower member 8.

As mentioned above, the battery unit 10 accommodated in the high voltage equipment-accommodation portion 13 provided behind the seat 3 is tilted rearward along the back 3a of the seat 3 in side view, while its upper part is fastened to the upper member 7 through multiple upper fastening points 53e, and its lower part is fastened to the lower member 8 through multiple lower fastening points 54e. Accordingly, the upper member 7 and the lower member 8 support the battery unit 10 at both ends in the vertical direction.

[Cooling Mechanism]

Next, a cooling mechanism C for cooling the battery unit 10 and the DC-DC converter 11 will be described with reference to FIGS. 1 and 3.

As shown in FIGS. 1 and 3, the cooling mechanism C is configured of the aforementioned inlet duct 55, exhaust duct 56, and intermediate duct 59, and also an air conditioning system 61, an intake duct 62, a cooling fan 63, a supply duct 64, and an exhaust passage 65. While the air conditioning system 61 is arranged in front of the seats 3 to air condition the vehicle inside 4, the cooling mechanism C cools the battery unit 10 and the DC-DC converter 11 by use of air (cold air) having passed through the air conditioning system 61. The cooling fan 63 is arranged in front of the seats 3, and above the center tunnel 5a. An intake port 63a of the cooling fan 63 is connected to the air conditioning system 61 through the intake duct 62, and a discharge port 63b of the cooling fan 63 is connected to the aforementioned inlet port 55a of the inlet duct 55 through the supply duct 64 provided inside the center console 12.

When powered on, the cooling fan 63 sucks in cooling air having passed through the air conditioning system 61 through the intake duct 62, and sends the sucked in cooling air to the inlet duct 55 of the battery unit 10 through the supply duct 64. The inlet duct 55 introduces the cooling air from the cooling fan 63 into the high voltage equipment-accommodation portion 13, and allows the cooling air to flow into the passages 51b of the two battery assemblies 60 arranged side by side, from below. The cooling air having flowed into the passages 51b of the battery assemblies 60 is guided upward while cooling the battery modules 51, and flows into the exhaust duct 56. The cooling air having flowed into the exhaust duct 56 is guided to one side (right side in the embodiment) along the exhaust duct 56, and is discharged to the DC-DC converter 11 from above, through the exhaust port 56b of the exhaust duct 56. The cooling air having flowed into the DC-DC converter 11 is guided downward while passing the back of and cooling the DC-DC converter 11, and is diffused into the high voltage equipment-accommodation portion 13 from a lower part of the DC-DC converter 11. Then, the cooling air diffused inside the high voltage equipment-accommodation portion 13 is discharged into the vehicle inside 4, through the discharge passage 65 formed on the lower end side of the high voltage equipment-accommodation portion 13.

[Intermediate Duct]

Next, an intermediate duct 59, which is a main part of the present invention, will be described with reference to FIGS. 8 and 9.

Figure 8:
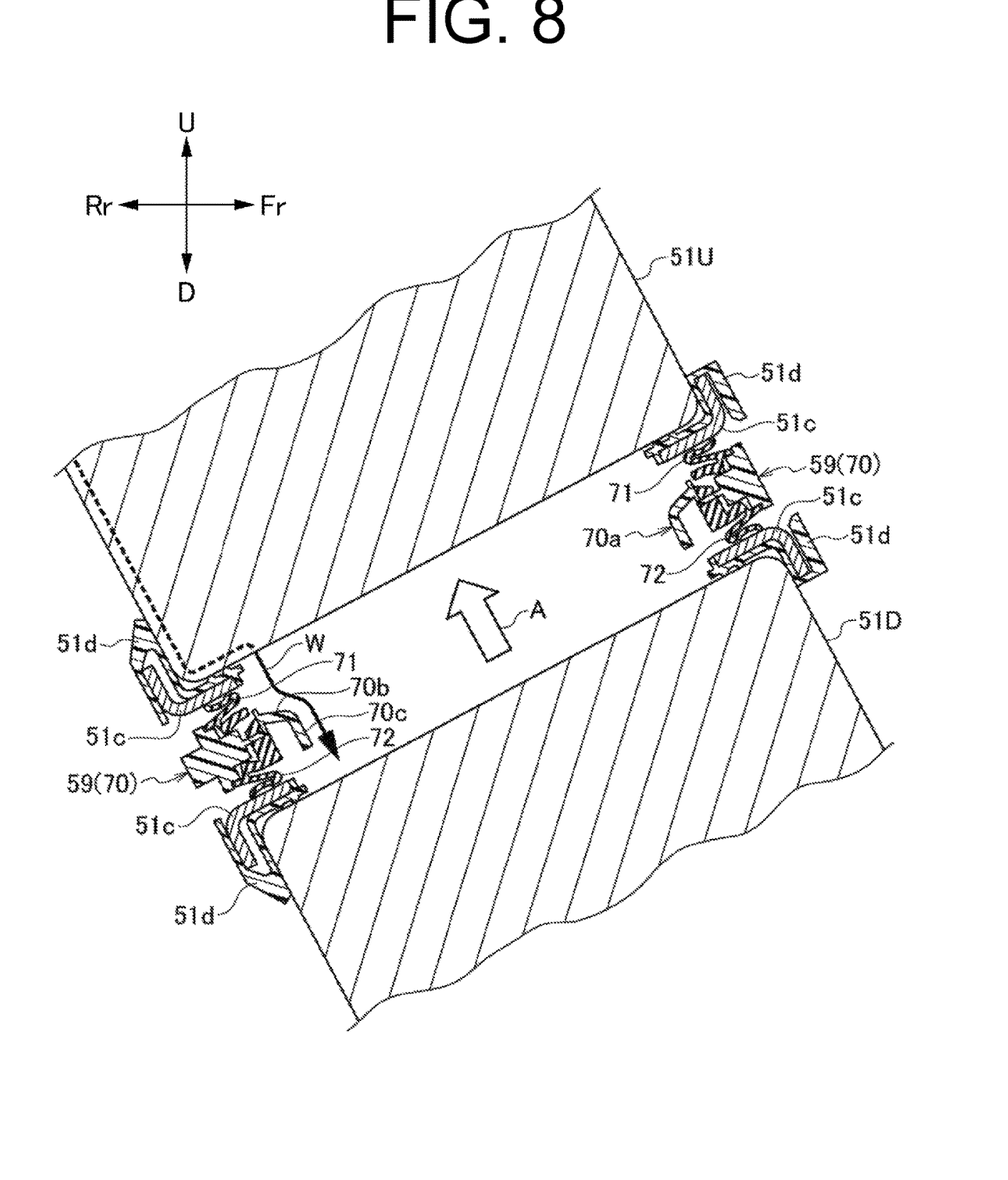
FIG. 8 is a cross-sectional view of an intermediate duct part of a battery assembly.

FIG. 8 is a cross-sectional view of the intermediate duct 59 part of the battery assembly 60.

As shown in FIG. 8, the intermediate duct 59 is arranged between the upper battery module 51U and the lower battery module 51D, while being sandwiched between a frame member 51c on a lower end edge of the upper battery module 51U and a frame member 51c on an upper end edge of the lower battery module 51D. The frame member 51c is a conductor, and supports the multiple batteries 51a through an insulation member 51d.

Figure 9:
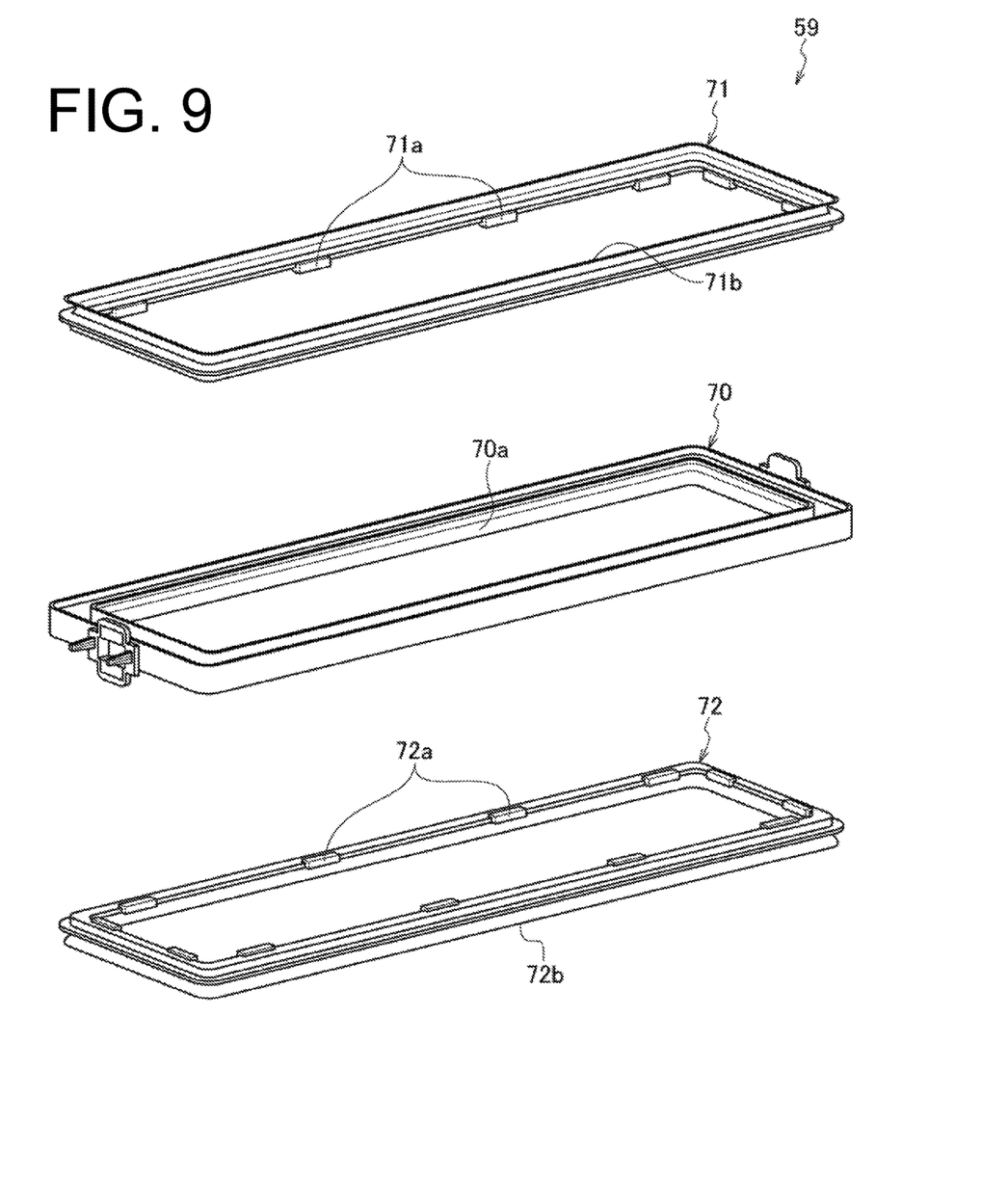
FIG. 9 is an exploded perspective view of the intermediate duct.

FIG. 9 is an exploded perspective view of the intermediate duct 59.

As shown in FIG. 9, the intermediate duct 59 includes an intermediate duct main body 70, a first seal member 71 closing a gap (an upper gap) between the intermediate duct main body 70 and the upper battery module 51U, and a second seal member 72 closing a gap (a lower gap) between the intermediate duct main body 70 and the lower battery module 51D. The intermediate duct main body 70 has multiple fitting grooves (not shown), spaced apart from one another in the circumferential direction. The first seal member 71 and the second seal member 72 respectively have multiple fitting protrusions 71a, 72a spaced apart from one another in the circumferential direction, and accordion-shaped seal portions 71b, 72b continuous in the circumferential direction. The first seal member and the second seal member are attached to the intermediate duct main body 70, by fitting the multiple fitting protrusions 71a, 72a into the fitting grooves of the intermediate duct main body 70. Also, each of the seal portions 71b, 72b closes a gap between the intermediate duct main body 70 and the upper battery module 51U or between the intermediate duct main body 70 and the lower battery module 51D, by bringing a tip end side of the seal portion into elastic contact with the frame member 51c of the upper battery module 51U or of the lower battery module 51D.

As shown in FIG. 8, inside the battery assembly 60, a flow A of cooling air flows from lower to upper parts along the passage 51b, and a flow W of dew condensation water flows from upper to lower parts along the passage 51b. When the water generated by condensation inside the upper battery module 51U flows to the lower battery module 51D side, if the water flowing continuously from the upper battery module 51U comes into contact with the frame member 51c of the lower battery module 51D, the batteries 51a of the upper battery module 51U may become conductive through the frame member 51c of the lower battery module 51D.

Hence, a cutwater portion 70a for cutting the continuous flow of water from the inside of the upper battery module 51U to the inside of the lower battery module 51D is continuously provided, along the entire inner circumference of the intermediate duct 59. The cutwater portion 70a is formed integrally with the intermediate duct main body 70, and extends inward from the inner circumference of the intermediate duct main body 70 to form an overhang from above the frame member 51c, while ensuring a gap between itself and the frame member 51c positioned therebelow.

To be more specific, the cutwater portion 70a includes a funnel portion 70b tilted in a funnel shape coming closer to the lower battery module 51D toward the inner side, and a tube portion 70c curving from the funnel portion 70b, and extending parallel to the flow direction of cooling air even closer toward the lower battery module 51D. A tip end part of the tube portion 70c is spaced apart from the frame member 51c. Note that the sectional shape of the cutwater portion 70a of the embodiment may be varied as appropriate, as long as it can cut the continuous flow of water from the inside of the upper battery module 51U to the inside of the lower battery module 51D.

As has been described, according to the battery unit 10 of the embodiment, the cutwater portion 70a for cutting the continuous flow of water from the inside of the upper battery module 51U to the inside of the lower battery module 51D is provided, along the inner circumference of the intermediate duct 59. Hence, conduction between the upper battery module 51U side and the lower battery module 51D side due to continuously flowing water can be avoided.

Also, since the cutwater portion 70a is formed integrally with the intermediate duct main body 70, it can be implemented without increasing the number of parts, or changing the shape of the first seal member 71 or the second seal member 72.

The cutwater portion 70a includes the funnel portion 70b tilted in a funnel shape coming closer to the lower battery module 51D toward the inner side, and the tube portion 70c curving from the funnel portion 70b, and extending parallel to the flow direction of cooling air even closer toward the lower battery module 51D. Hence, water droplets can be kept from pooling in the cutwater portion 70a.

Note that the present invention is not limited to the embodiment described above, and may be modified or improved, for example, as is appropriate.

For example, although two battery modules are stacked in the direction of passages in the battery module of the embodiment, three or more battery modules may be stacked in the direction of passages.

The above embodiments of the present invention aim to provide a battery unit that can prevent conduction due to condensation, despite including an upper battery module and a lower battery module stacked in the direction of passages.

To achieve the above objective, a battery unit (e.g. battery unit 10 of later-mentioned embodiment) according to a first aspect of the present invention includes a battery module (e.g. battery module 51 of later-mentioned embodiment) formed of multiple batteries (e.g. batteries 51a of later-mentioned embodiment) arranged in parallel, with cooling air passages (e.g. passages 51b of later-mentioned embodiment) interposed therebetween. the battery module includes an upper battery module (e.g. upper battery module 51U of later-mentioned embodiment) and a lower battery module (e.g. lower battery module 51D of later-mentioned embodiment) stacked in a flow direction of cooling air. an intermediate duct (e.g. intermediate duct 59 of later-mentioned embodiment) for preventing leakage of cooling air is arranged between the upper battery module and the lower battery module. a cutwater portion (e.g. cutwater portion 70a of later-mentioned embodiment) for cutting a continuous flow of water from the inside of the upper battery module to the inside of the lower battery module is provided, along an inner circumference of the intermediate duct.

In the power unit according to the first aspect of the present invention, the cutwater portion for cutting the continuous flow of water from the inside of the upper battery module to the inside of the lower battery module is provided, along the inner circumference of the intermediate duct. Hence, conduction between the upper battery module side and the lower battery module side due to continuously flowing water can be avoided.

In the battery unit according to the second aspect of the present invention, the intermediate duct includes an intermediate duct main body (e.g. intermediate duct main body 70 of later-mentioned embodiment), a first seal member (e.g. first seal member 71 of later-mentioned embodiment) closing a gap between the intermediate duct main body and the upper battery module, and a second seal member (e.g. second seal member 72 of later-mentioned embodiment) closing a gap between the intermediate duct main body and the lower battery module. The cutwater portion is formed integrally with the intermediate duct main body.

In the power unit according to the second aspect of the present invention, since the cutwater portion is formed integrally with the intermediate duct main body, it can be implemented without increasing the number of parts, or changing the shape of the first seal member or the second seal member.

In the battery unit according to any one of the first and second aspects of the present invention, the cutwater portion includes a funnel portion (e.g. funnel portion 70b of later-mentioned embodiment) tilted in a funnel shape coming closer to the lower battery module toward the inner side, and a tube portion (e.g. tube portion 70c of later-mentioned embodiment) curving from the funnel portion, and extending parallel to the flow direction even closer toward the lower battery module.

In the power unit according to the third aspect of the present invention, the cutwater portion includes the funnel portion tilted in a funnel shape coming closer to the lower battery module toward the inner side, and the tube portion curving from the funnel portion, and extending parallel to the flow direction of cooling air even closer toward the lower battery module. Hence, water droplets can be kept from pooling in the cutwater portion.

Obviously, numerous modifications and variations of the present invention are possible in light of the above teachings. It is therefore to be understood that within the scope of the appended claims, the invention may be practiced otherwise than as specifically described herein.

What is claimed is:

1. A battery unit comprising:
a battery module formed of a plurality of batteries arranged in parallel, with cooling air passages interposed therebetween, wherein:
said battery module includes an upper battery module and a lower battery module stacked in a flow direction of cooling air;
an intermediate duct for preventing leakage of cooling air is arranged between said upper battery module and said lower battery module; and
a cutwater portion for cutting a continuous flow of water from an inside of said upper battery module to an inside of said lower battery module is provided, along an inner circumference of said intermediate duct.

2. The battery unit according to claim 1, wherein:
said intermediate duct includes
an intermediate duct main body,
a first seal member closing a gap between said intermediate duct main body and said upper battery module, and
a second seal member closing a gap between said intermediate duct main body and said lower battery module; and
said cutwater portion is formed integrally with said intermediate duct main body.

3. The battery unit according to claim 1, wherein
said cutwater portion includes a funnel portion tilted in a funnel shape coming closer to said lower battery module toward the inner side, and a tube portion curving from the funnel portion, and extending parallel to said flow direction even closer toward said lower battery module.

4. A battery unit comprising:
a lower battery module comprising:
lower batteries; and lower cooling air passages each of which is interposed between a first lower battery and a second lower battery adjacent to the first lower battery among the lower batteries;

an upper battery module stacked on the lower battery module via a gap at an downstream of the lower battery module in a flow direction of the cooling air and comprising:
  upper batteries; and
  upper cooling air passages each of which is interposed between a first upper battery and a second upper battery adjacent to the first upper battery among the upper batteries; and an intermediate duct provided between the upper battery module and the lower battery module to prevent leakage of the cooling air and comprising:
  a cutwater portion provided along an inner circumference of the intermediate duct to cut a continuous flow of water from an inside of the upper battery module to an inside of the lower battery module.

5. The battery unit according to claim 4,
the intermediate duct comprising:
  an intermediate duct main body;
  a first seal member to close an upper gap between the intermediate duct main body and the upper battery module; and
  a second seal member to close a lower gap between the intermediate duct main body and the lower battery module,
wherein the cutwater portion is formed integrally with the intermediate duct main body.

6. The battery unit according to claim 4,
the cutwater portion comprising:
  a funnel portion having a funnel shape to be tilted inwardly toward the lower battery module; and
  a tube portion curving from the funnel portion and extending parallel to the flow direction toward the lower battery module.

* * * * *